United States Patent [19]

Le Lievre

[11] Patent Number: 5,716,571
[45] Date of Patent: Feb. 10, 1998

[54] METHOD FOR MAKING A GLAZING SURROUNDED BY CAST PLASTIC

[75] Inventor: Patrick Le Lievre, Apremont, France

[73] Assignee: Saint-Gobain Vitrage International, Courbevoie, France

[21] Appl. No.: 261,972

[22] Filed: Jun. 17, 1994

[30] Foreign Application Priority Data

Jun. 18, 1993 [FR] France .................... 9307375

[51] Int. Cl.⁶ .......................... B29C 45/14; B29C 45/26
[52] U.S. Cl. .................. 264/161; 264/163; 264/252; 264/276
[58] Field of Search ........................... 264/252, 255, 264/161, 163, 250, 259, 271.1, 275, 276

[56] References Cited

U.S. PATENT DOCUMENTS

| | | | |
|---|---|---|---|
| 3,996,330 | 12/1976 | Jones et al. | 264/328.9 |
| 4,830,804 | 5/1989 | Weaver | 264/161 |
| 4,861,538 | 8/1989 | Stalter, Sr. | 264/161 |
| 4,880,587 | 11/1989 | Fichseder et al. | 264/161 |
| 4,915,395 | 4/1990 | Barteck | 264/252 |
| 5,057,265 | 10/1991 | Kunert et al. | 264/161 |
| 5,108,687 | 4/1992 | Jourquin et al. | 264/252 |
| 5,456,874 | 10/1995 | Cordes et al. | 264/252 |
| 5,464,575 | 11/1995 | Jaffiol et al. | 264/252 |

FOREIGN PATENT DOCUMENTS

| | | | |
|---|---|---|---|
| 63-89316 | 4/1988 | Japan | 425/129.1 |
| 63-89317 | 4/1988 | Japan | 425/129.1 |

*Primary Examiner*—Angela Y. Ortiz
*Attorney, Agent, or Firm*—Oblon, Spivak, McClelland, Maier & Neustadt, P.C.

[57] ABSTRACT

A device for obtaining a glazing surrounded, on at least a portion of its periphery, by cast plastic including an injection head, a cavity, an injection dam and at least one mold part in the wall of which a duct is provided. The duct has two parts, one part located outside the joint plane and one part located in the joint plane.

7 Claims, 2 Drawing Sheets

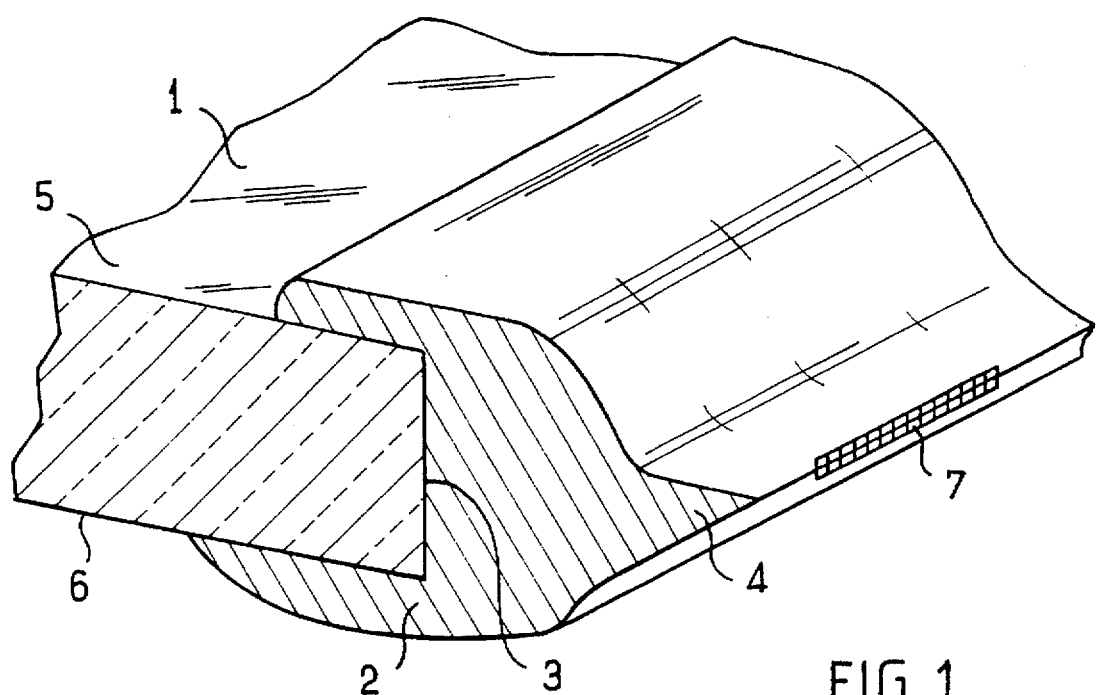
FIG_1
PRIOR ART
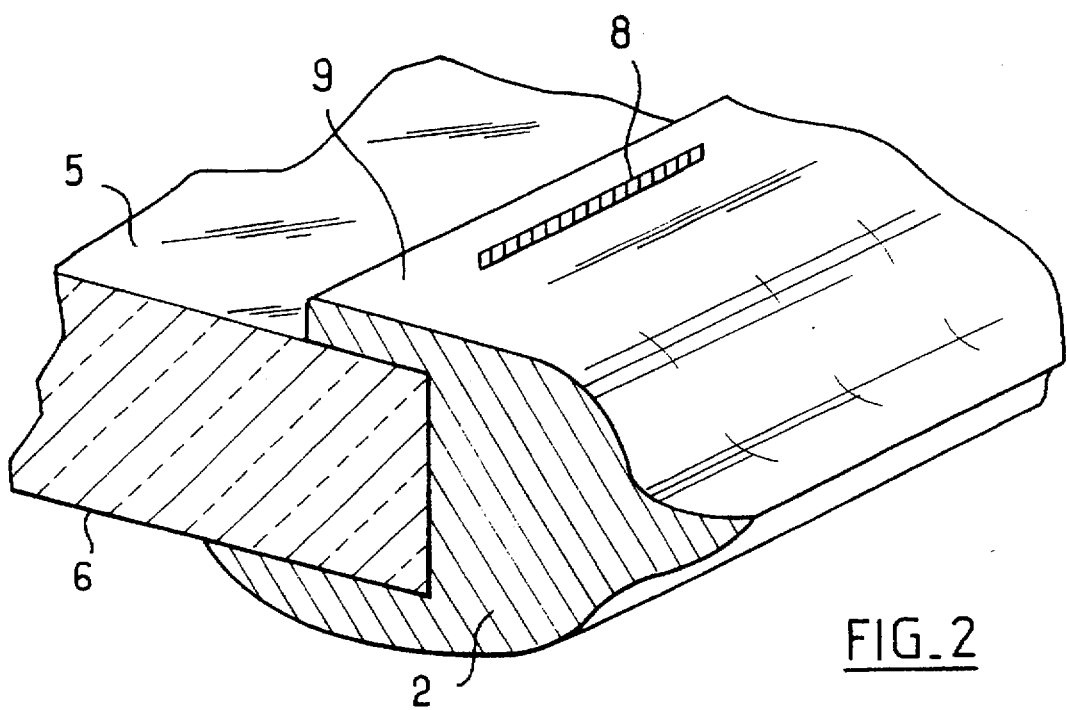
FIG_2

METHOD FOR MAKING A GLAZING SURROUNDED BY CAST PLASTIC

BACKGROUND OF THE INVENTION

1. Field of the invention

The invention relates to a device for obtaining a glazing surrounded, on at least a portion of its periphery, by cast plastic. The invention also relates to the method and device for obtaining such a glazing.

2. Description of the Related Art

The plastic surrounding the glazing on at least a portion of its periphery can constitute a seal and/or an assembly joint therefor. Functional elements such as fastening means, guiding means, etc. can also be present either in the form of inserts, e.g., at least partially buried in the plastic, or formed from this plastic. Usually this plastic, or encapsulation material, covers at least the width of the edge of the glazing.

Regardless of the function of the encapsulation material, the cast glazing is generally obtained by injecting the plastic into a mold in which the glazing is previously placed. This mold itself consists of two parts, a lower part and an upper part, also called a mold and countermold. After having closed the mold, the plastic is injected into a mold cavity by an injection head. A feed duct is provided in the wall of the mold to route the plastic from the injection head to the cavity of the mold. This duct can have any shape. The end of the injection duct, constituting a boundary between the feed duct and the cavity of the mold, is usually called an injection dam. It constitutes a type of entry for the plastic into the cavity.

Usually, the injection head and the feed duct are located at the level of the joint plane defined by the surface located between the two parts of the mold, i.e., the surface of one of the parts of the mold, for example the upper part, intended to come in contact with the surface of its complementary part, for example the lower part.

This arrangement has the advantages of simplifying the design of the mold and of locating the injection dam at the level of the edge of the glazing, advantageously at the center of the edge of the glazing.

However, the plastic formed in the feed duct constitutes an excess part that must be eliminated after removal from the mold. When the injection dam is relatively thick, particularly for glazings of large dimensions, this operation is difficult. It often causes defects such as a reduction of the thickness of the encapsulation material, that can be seen. Furthermore, when the encapsulation material forms a lip of small thickness at the level of the injection dam, the elimination of the excess plastic is difficult and sometimes damages the lip.

Furthermore, during the injection of the plastic it is necessary to drive out the air present in the cavity to prevent any formation of bubbles and/or a poor filling of the cavity. Vents can be provided for this purpose. However, in certain cases, they are not entirely satisfactory.

SUMMARY OF THE INVENTION

It is an object of the invention to provide a device whose design is simple and that makes possible an easy elimination of the excess plastic.

It is a further object of the invention to provide a glazing surrounded, on at least a portion of its periphery, by cast plastic. The device includes an injection head, a cavity, an injection dam and at least one mold part in the wall of which a duct is provided and houses said injection dam. The duct has two parts, one part located outside the joint plane and one part located in the joint plane.

The injection dam is thus located, according to the invention, on a face of the encapsulation material covering at least a portion of the glazing, advantageously on the face of the encapsulation material intended to be hidden: the removal of the excess plastic does not then run the risk of damaging the encapsulation material and particularly its lip. Furthermore, the device of the invention offers an additional advantage of easy removal of the excess plastic formed in the duct.

According to an embodiment of the invention, the injection head is located in the joint plane, particularly in the extension of the part of the duct located in this plane. The design of the mold as well as the removal of the excess plastic from the duct are thereby accordingly facilitated.

The device of the invention includes at least one mold consisting of two parts.

A duct is provided in the wall of one of the parts of the mold. A part of this duct is located, according to the invention, outside the joint plane. It has, at one of its ends, the injection dam.

This part can be curved or a flat panel. Preferably, it comprises several segments, these segments being curves and/or panels. These segments can have a parallelepiped or cylindrical shape.

The radii of curvature or the angles of the panels with respect to the joint plane depend on the shape and dimensions of the encapsulation material. When it is an inclined panel, the angle is, for example, between 30° and 60° in relation to the joint plane.

This part of the duct according to the invention is advantageously composed of at least two segments. Preferably, the end of the first segment in contact with the second segment, or entry appendage, constitutes a break line. The plastic formed in the second segment, whose end constitutes the injection dam, or entry appendage, is preferably separated from the rest of the plastic formed in the first segment, during the opening of the mold. To constitute a break line between the entry appendage and at least one segment, the end of the segment in contact with the entry appendage exhibits a small thickness. This thickness is a function of the geometry of the break line as well as of the tearing strength of the material used. Advantageously, the entry appendage is perpendicular to the joint plane. After opening of the mold, the excess plastic remaining in the feed duct is thus easily withdrawn. The plastic formed in the entry appendage is integral with the encapsulation material and is removed by sectioning, for example by use of a cutting blade followed, optionally, by brushing.

As for the part of the mold located in the joint plane, it has any shape, preferably approximately straight to limit its length.

The volume of the duct of the invention is advantageously limited, on the one hand, to simplify the design of the mold and, on the other hand, to reduce the amount of excess plastic. This volume is a function of the dimensions of the glazing to be encapsulated. It is on the order of 10 to 15% of the volume of the cavity of the mold. To do this, the part of the duct located in the joint plane preferably consists of two segments, preferably two panels: a first segment inclined in relation to the joint plane and a second segment, or entry appendage, one end of which constitutes the injection dam. It connects the first inclined segment to the cavity of the mold. According to an advantageous variant, the device comprises only one injection dam.

The invention also relates to a method for obtaining a glazing surrounded, on at least a portion of its periphery, by cast plastic using a device of the invention. The method comprises, in particular, the following steps:

positioning of the glazing in one of the parts of the mold and, optionally, of inserts, closing of the complementary part of the mold, injection of the plastic, opening of the mold, removal of the excess plastic formed in the duct and at the level of the encapsulation material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a section, in perspective, of a conventional glazing;

FIG. 2 is a section, in perspective, of a glazing according to the invention;

DETAILED DESCRIPTION OF THE PREFERRED EMBODIMENTS

Figure 3:
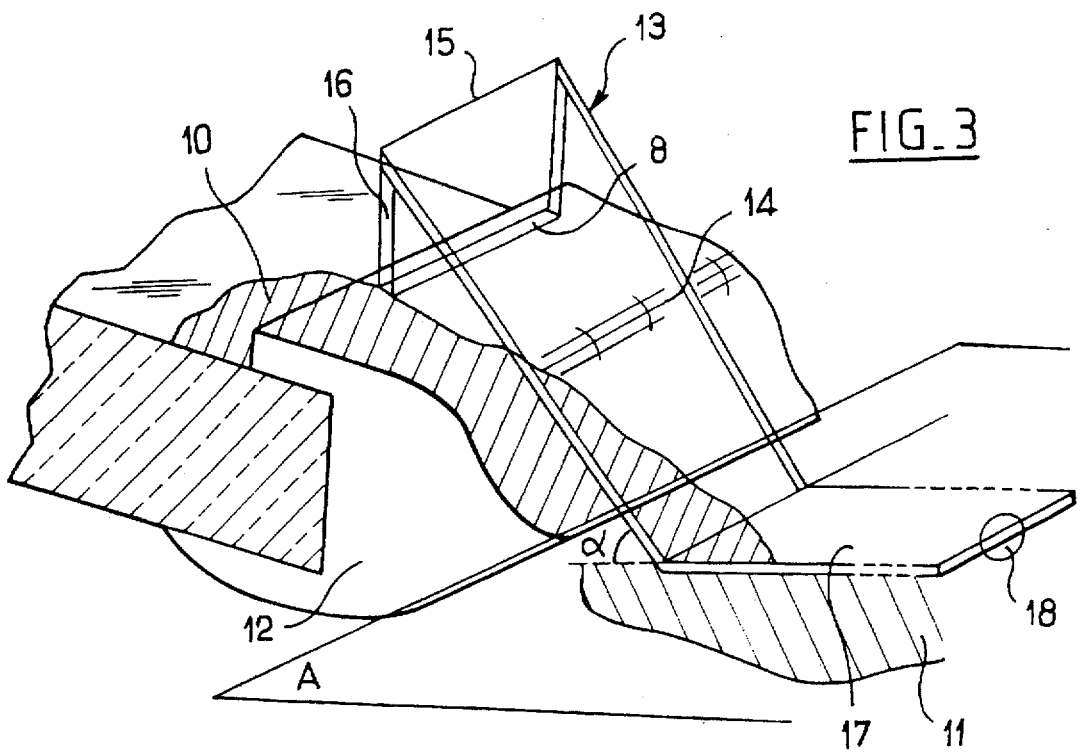
FIG. 3 is a longitudinal section of a mold according to the invention.

Referring now to the drawings, wherein like reference numerals designate identical or corresponding parts throughout the several views, and more particularly to FIG. 1 thereof, in FIG. 1, glazing 1 is surrounded by a conventional plastic 2 covering edge 3 of the glazing. The plastic, or encapsulation material, 2 comprises a lip 4 of small thickness intended to cover the bodywork opening or any other support. The plastic is shown as overflowing on faces 5 and 6 of the glazing. It can also be flush with one of the two faces 5 or 6, or with both faces 5 and 6. The injection dam, referenced at 7, and optionally not visible, is located in the center of the edge of the glazing. The visible face, once the glazing is mounted in the bodywork opening, is face 6.

FIG. 2 shows a glazing according to the invention. Injection dam 8 is located on face 9 of the encapsulation material overflowing on face 5 of the glazing. It is the hidden face when the glazing is mounted in the bodywork opening. It can also be located on the face of the encapsulation material overflowing on face 6 of the glazing.

FIG. 3 shows a portion of the device according to the invention. The device comprises, in particular, a mold. The mold consists of two parts, an upper part 10 and a lower part 11, forming cavity 12 of the mold. This cavity is shown here in the upper part and the lower part of the mold. It can also be located only in the upper or lower part.

The duct according to the invention comprises two parts 13 and 17. Part 13 is located outside the joint plane, represented as A. In this Figure, it comprises two segments 14 and 16: a first inclined panel 14 and, in contact with its end 15, a second panel or entry appendage 16. The end of the entry appendage constitutes injection dam 8.

Inclined panel 14 forms an angle α with joint plane A. This angle is, advantageously, between 30° and 60°.

The width of inclined panel 14 can decrease in the direction of the thickness of the mold, as illustrated in the Figure. It can also increase or be constant. Of course, the dimensions of inclined panel 14 are independent of those of the duct. Also, the dimensions of panel 16 can vary as a function of the dimensions of end 15 of inclined panel 14 and as a function of the dimensions of injection dam 8. These dimensions, more specifically the thickness multiplied by the width, are approximately proportional to the amount of material necessary to form the encapsulation material.

To form a break line between entry appendage 16 and inclined panel 14, the thickness of end 15 of panel 14 is, for example, less than or equal to 4 mm and, preferably, less than or equal to 2 mm. Preferably, the thickness of inclined panel 14 decreases in the direction of the thickness of the mold (e.g., toward the left in FIG. 3) to form a sort of bevel, not shown, at its end 15. Thus, a satisfactory break line is obtained at end 15 while maintaining a certain amount of material formed in inclined panel 14 to facilitate its removal after opening of the mold. For the same reason, entry appendage 16 is, preferably, perpendicular to joint plane A.

Duct part 17 of the invention is located in joint plane A. It can be in the extension of injection head 18. The latter is, for example, an injection nozzle. It is located, preferably, in the extension of joint plane A.

This part 17 can have any shape. It can be, for example, a duct with a cylindrical or parallelepiped or trapezoidal shape. It can also have curves.

When the injected material is of the RIM (Reaction Injection Molding) type, it preferably includes a static mixer or static mixers near the injection head.

The length of part 17 is a function of the envisaged use. It can be restricted to a few centimeters.

The dimensions of the duct of the invention are such that the plastic formed in the duct can easily be removed from the mold, while assuring a homogeneous flow to feed the cavity of the mold. Movable parts of the mold can also be provided to facilitate the removal from the mold.

Figure 4A:
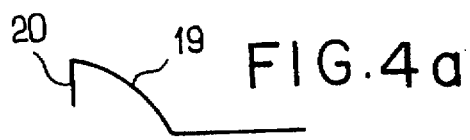
FIGS. 4a and 4b comprise two diagrams schematically representing a longitudinal section of two variants of feed ducts according to the invention.
Figure 4B:
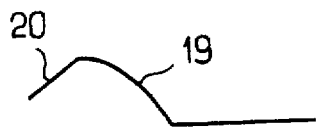

FIGS. 4a and 4b show two variants of the duct according to the invention. The part of duct 13 comprises, in these variants, two segments 19 and 20. Segment 19 can be curved, as illustrated in FIGS. 4a and 4b. Also, segment 20, or entry appendage, can be inclined with respect to the joint plane, as illustrated in FIG. 4b. It is advantageously perpendicular to the joint plane, as illustrated in FIG. 4a. The angles defined respectively by segment 19 and by segment 20 with respect to the joint plane are advantageously such that the plastic formed in these two segments can easily be removed from the mold. Furthermore, movable elements can be provided to remove the excess plastic from the mold.

Of course, any variant can be envisaged without departing from the spirit of the invention.

Figure 5:
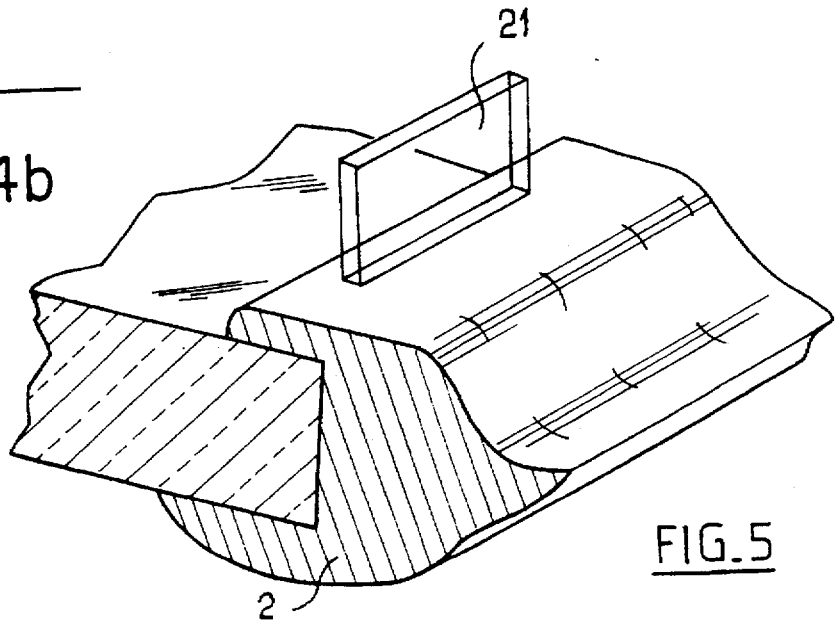
FIG. 5 shows the glazing according to the invention after opening of the mold.

FIG. 5 illustrates the cast or encapsulated glazing after the opening of the mold. Plastic 21 formed in entry appendage 16 is then integral with encapsulation material 2. It can be removed by a cutting blade followed, optionally, by a brushing. Any other suitable means can also be envisaged.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. Method for obtaining a monolithic or laminated glazing surrounded, on at least a portion of its periphery, by cast plastic, the method comprising the steps of:

placing a glazing in a mold having a cavity, said mold defining a joint plane and a duct, said duct having a first part outside the joint plane and a second part in the joint plane;

injecting a plastic material into the cavity via the duct to form the cast plastic, wherein an injection head is located at the joint plane of the mold; and removing the glazing having the cast plastic from the mold.

2. A method according to claim 1, wherein said duct defines a break line in the first part outside the joint plane, wherein said removing step comprises breaking the plastic in the duct at the break line.

3. A method according to claim 1, comprising the further step of closing the mold after the glazing is placed in the mold and before the injecting step.

4. A method according to claim 1, wherein said injection head supplies injection material to the second part of the duct in the joint plane.

5. A method according to claim 1, wherein the plastic material is injected into the cavity through an injection dam, said first part of the duct outside the joint plane ending in said injection dam, said injection dam being connected to the cavity at a portion of the cavity which corresponds to a face of the cast plastic which covers at least a portion of the glazing.

6. A method according to claim 4, wherein the second part of the duct in the joint plane extends from the injection head.

7. A method according to claim 6, wherein the second part of the duct in the joint plane communicates with the first part of the duct outside the joint plane.

* * * * *